(12) United States Patent
Boecker et al.

(10) Patent No.: US 9,475,382 B2
(45) Date of Patent: *Oct. 25, 2016

(54) FUEL TANK SUPPORT

(71) Applicant: TI Automotive Technology Center GmbH, Rastatt (DE)

(72) Inventors: Albert J. Boecker, Ettlingen (DE); Andreas W. Dobmaier, Karlsruhe (DE); Alex Ehler, Rastatt (DE); Peter Grauer, Steinweiler (DE); Matthias B. Olbrich, Trimbach (FR)

(73) Assignee: TI Automotive Technology Center GmbH, Rastatt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,549

(22) Filed: Apr. 27, 2015

(65) Prior Publication Data

US 2015/0224871 A1 Aug. 13, 2015

Related U.S. Application Data

(63) Continuation of application No. 12/562,266, filed on Sep. 18, 2009.

(51) Int. Cl.
*B60K 15/03* (2006.01)
*B60K 15/077* (2006.01)
(Continued)

(52) U.S. Cl.
CPC ... *B60K 15/03177* (2013.01); *B60K 15/03519* (2013.01); *B60K 15/073* (2013.01);
(Continued)

(58) Field of Classification Search
CPC .. B60K 15/03; B60K 15/073; B60K 15/077; B60K 15/03177; B60K 15/03519; B60K 2015/03243; B60K 2015/0344; B60K 2015/03217; B60K 2015/03256; B60K 2015/03493
See application file for complete search history.

(56) References Cited

U.S. PATENT DOCUMENTS

| | | |
|---|---|---|
| 3,314,567 A | 4/1967 | Becker et al. |
| 3,712,502 A | 1/1973 | Basier et al. |

(Continued)

FOREIGN PATENT DOCUMENTS

| | | |
|---|---|---|
| JP | 2000-043588 A | 2/2000 |
| JP | 2005-162010 A | 6/2005 |

(Continued)

OTHER PUBLICATIONS

International Search Report and Written Opinion, International Application No. PCT/EP2010/063690, Filing Date: Sep. 17, 2010, Mailing Date: Mar. 29, 2011, 6 pages.

(Continued)

*Primary Examiner* — Stephen Castellano
(74) *Attorney, Agent, or Firm* — Brinks Gilson & Lione

(57) ABSTRACT

An endoskeleton to support a fuel tank body and establish a fuel tank. The endoskeleton may include columns to support fuel system components, first and second beams staggered with respect to one another and having tank contact portions attachable to the tank body, and walls extending between adjacent first and second beams to baffle fuel and to yieldably restrain movement of the body. The fuel tank body may have a wall thickness of about 2 to 4 mm, and a combined weight of the tank body and the endoskeleton may be less than a weight of the fuel tank if the body were about 4 to 6 mm in wall thickness. Also, an endoskeleton-to-tank body contact surface area ratio may be greater than about 4% of a total interior surface area of the tank body. Further, fuel tank may include a strength to weight ratio greater than 250 l-mbar/kg.

9 Claims, 6 Drawing Sheets

(51) Int. Cl.
  *B60K 15/035* (2006.01)
  *B60K 15/073* (2006.01)

(52) U.S. Cl.
  CPC ............ *B60K15/077* (2013.01); *B60K 15/03* (2013.01); *B60K 2015/0344* (2013.01); *B60K 2015/03217* (2013.01); *B60K 2015/03243* (2013.01); *B60K 2015/03493* (2013.01)

(56) References Cited

U.S. PATENT DOCUMENTS

| | | | |
|---|---|---|---|
| 3,877,845 A * | 4/1975 | Green | F04D 9/002 |
| | | | 417/366 |
| 4,878,591 A | 11/1989 | Johnston | |
| 4,952,347 A | 8/1990 | Kasugai | |
| 5,326,514 A | 7/1994 | Linden et al. | |
| 5,384,172 A | 1/1995 | Takado et al. | |
| 5,398,839 A | 3/1995 | Kleyn | |
| 6,135,306 A | 10/2000 | Clayton et al. | |
| 6,138,859 A * | 10/2000 | Aulph | B60K 15/03 |
| | | | 137/574 |
| 6,293,420 B1 | 9/2001 | Richter et al. | |
| 6,338,420 B1 | 1/2002 | Pachciarz et al. | |
| 6,395,357 B1 | 5/2002 | Abu-Isa | |
| 6,712,234 B2 | 3/2004 | Boecker | |
| 6,978,802 B2 | 12/2005 | Hagano et al. | |
| 7,166,253 B2 | 1/2007 | Van Schaftingen et al. | |
| 7,455,190 B2 | 11/2008 | Potter et al. | |
| 9,050,889 B2 * | 6/2015 | Boecker | B60K 15/03177 |
| 2002/0100759 A1 | 8/2002 | Schmidt et al. | |
| 2003/0015537 A1 | 1/2003 | Konja | |
| 2003/0136507 A1 | 7/2003 | Thiel et al. | |
| 2004/0011786 A1 | 1/2004 | Wade | |
| 2004/0129708 A1 | 7/2004 | Borchert et al. | |
| 2008/0110900 A1 | 5/2008 | Veenendaal | |
| 2008/0224363 A1 | 9/2008 | Criel et al. | |
| 2009/0139994 A1 | 6/2009 | Aoki et al. | |
| 2009/0189384 A1 | 7/2009 | Schoen et al. | |

FOREIGN PATENT DOCUMENTS

| | | |
|---|---|---|
| JP | 2009-132297 A | 6/2009 |
| SU | 1074954 A | 2/1984 |

OTHER PUBLICATIONS

Text of First Office Action in CN 201080041613X issued on Apr. 24, 2014, 16 pages.

Translation of Japanese Office Action in JP 2012-529283 dated May 27, 2014, 5 pages.

* cited by examiner

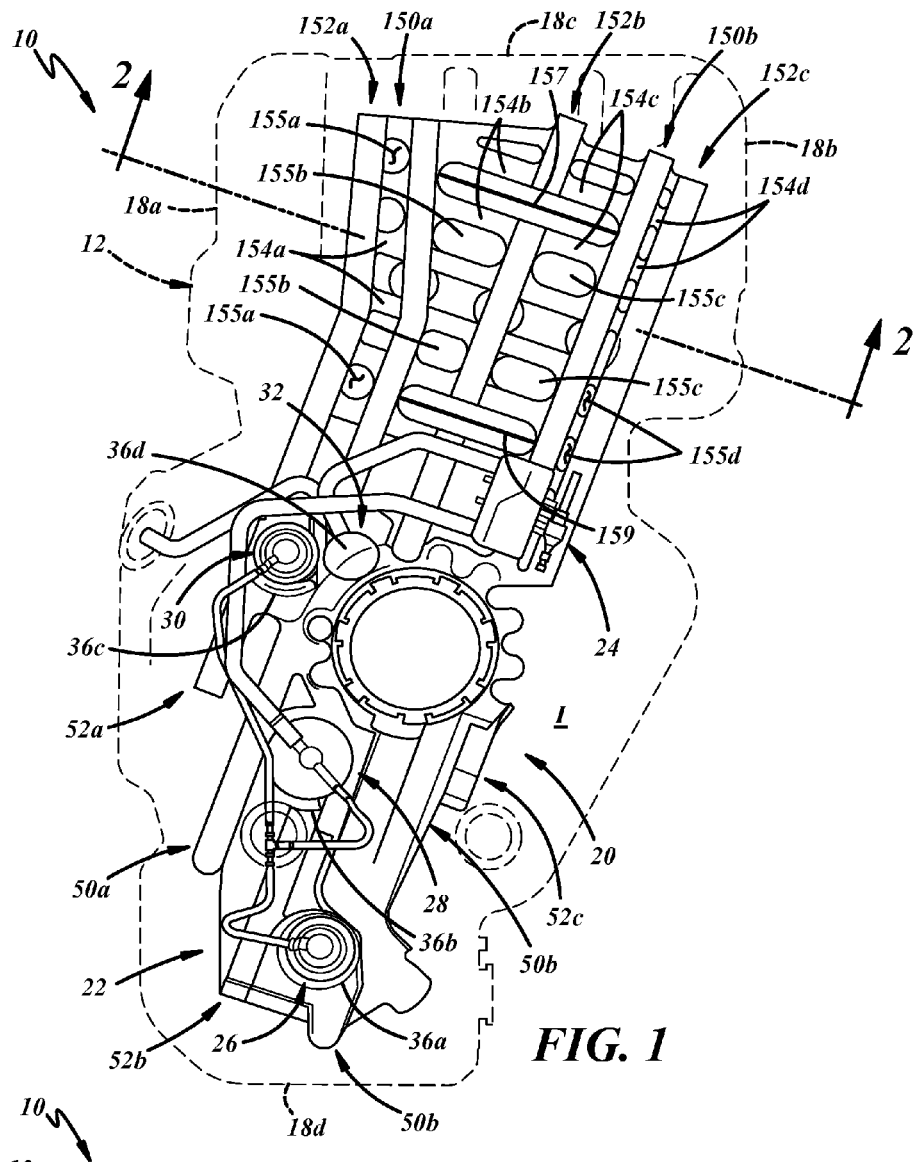
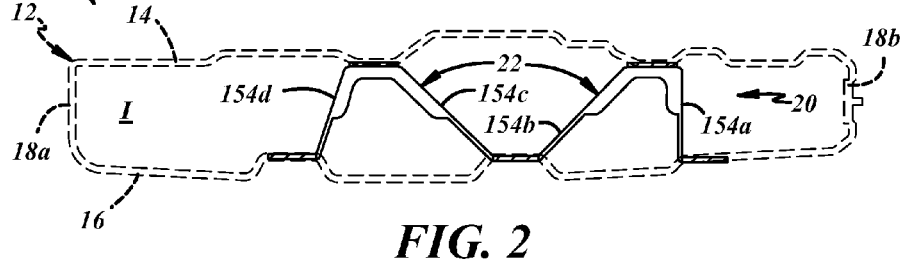

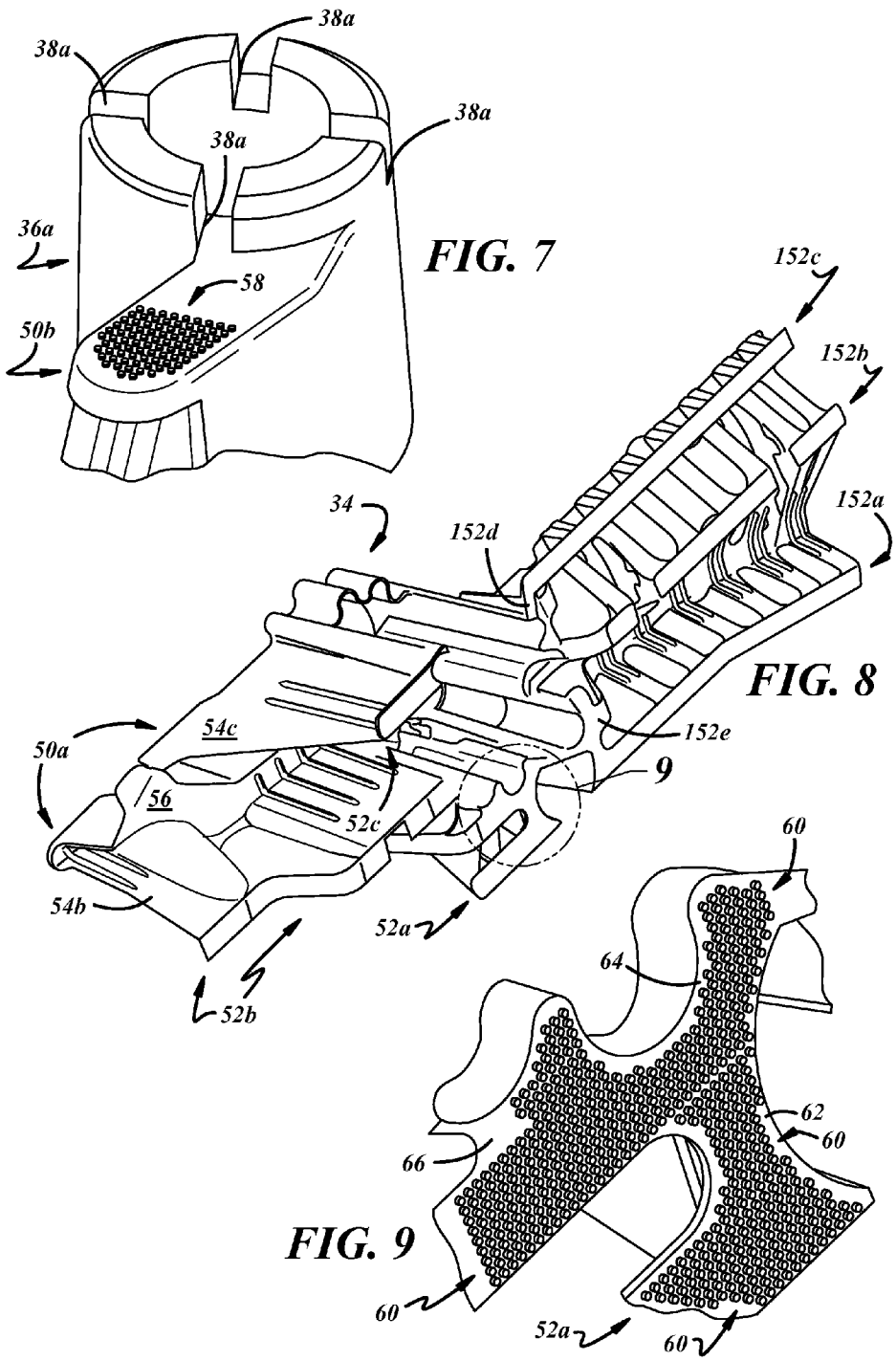

FUEL TANK SUPPORT

TECHNICAL FIELD

The present disclosure relates generally to fluid receptacles and, more particularly, to plastic fuel tanks and related components.

BACKGROUND

Plastic fuel tanks typically include a hollow body having one or more openings, and a plurality of fuel system components disposed in the interior of the body such as individual pumps, valves, and the like. The components may be inserted through the one or more openings, or may be molded in the interior of the body when the tank is manufactured. In some applications, one or more of the components may be mounted on a carrier that is inserted between molds in an interior of a parison that is blow molded around the carrier and into conformity with the molds. The carrier typically has standoffs or feet that contact corresponding portions of the tank to position and support the carrier within the tank. But such a carrier is basically another component to be supported within and by the walls of the fuel tank.

In use, fuel vapors in the tank are typically vented for temporary storage in a carbon canister until the vapors can be purged into the engine. But in some vehicle applications it is desirable to limit such venting of vapors and, as a result, the fuel tank may become pressurized which may be damaging to a tank.

SUMMARY

A fuel tank for a vehicle according to one implementation includes a tank body having an upper wall, a lower wall, and side walls between the upper and lower walls and defining an interior in which fuel is stored. The tank also includes a plurality of fuel system components disposed in the interior of the tank body and including at least one of a rollover valve, a fuel level vent valve, a fuel tank isolation valve, or a fuel level indicator. The tank further includes a unitary endoskeleton to reinforce the tank body, baffle fuel in the tank body, and carry the plurality of fuel system components in the tank body. The endoskeleton include a plurality of at least partially hollow columns to support the plurality of fuel system components, and a plurality of spaced apart generally horizontally extending upper and lower beams that are staggered with respect to one another such that the upper beams are not directly above the lower beams, and having tank contact portions attached to the upper and lower walls of the body. The endoskeleton also includes a plurality of walls extending between and interconnecting adjacent upper and lower beams to baffle fuel and to yieldably restrain movement of the upper and lower walls, wherein the tank body has a wall thickness of less than 3 mm but at least 2 mm.

According to a further implementation, a fuel tank for a vehicle includes a polymeric tank body defining an interior in which fuel is stored, and a polymeric endoskeleton disposed in the interior of the body support the body. An endoskeleton-to-tank body contact surface area ratio may be greater than about 4% of a total interior surface area of the tank body. The tank body has a (volume×pressure) to weight ratio greater than 250 l-mbar/kg and has a wall thickness of two to less than three millimeters.

According to an additional implementation, a fuel tank for a vehicle includes a tank body defining an interior in which fuel is stored, and being composed of layers of HDPE, EVOH, and adhesive, and an endoskeleton disposed in the interior of the body to support the body, wherein the fuel tank includes a (volume×pressure) to weight ratio greater than 250 l-mbar/kg. The endoskeleton includes a plurality of spaced apart generally horizontally extending upper and lower beams being staggered with respect to one another such that the upper beams are not directly above the lower beams, and having tank contact portions, and a plurality of walls extending between and interconnecting adjacent upper and lower beams. The tank body has a wall thickness of less than 3 mm but at least 2 mm, and a combined weight of the tank body and the endoskeleton is less than a weight of a tank body alone without the endoskeleton if the walls of the tank body alone were about 4 to 6 mm in wall thickness and the tank body alone was otherwise identical to the tank body.

A unitary support for a body of a fuel tank according to one implementation includes a plurality of at least partially hollow columns integrally interconnected by walls and including a fuel pump module column and at least one of a C-ROV column, an FLVV column, or an FTIV column. The support also includes a plurality of spaced apart generally horizontally extending upper and lower beams integrally interconnected to the plurality of hollow columns and being staggered with respect to one another such that the upper beams are not directly above the lower beams, and having tank contact portions. The support further includes a plurality of obtusely walls extending between and interconnecting adjacent upper and lower beams.

A unitary support for a tank body of a fuel tank according to another implementation includes a plurality of at least partially hollow columns to support a plurality of fuel system components, a plurality of spaced apart generally horizontally extending upper and lower beams being staggered with respect to one another such that the upper beams are not directly above the lower beams, and having tank contact portions, and a plurality of walls extending between and connecting adjacent upper and lower beams. The plurality of at least partially hollow columns includes a fuel pump module column to support a fuel pump module and that includes at least one of a fuel level indicator arm opening or a trough opening to receive fuel.

BRIEF DESCRIPTION OF THE DRAWINGS

The following detailed description of exemplary embodiments and best mode will be set forth with reference to the accompanying drawings, in which:

FIG. 1 is a top view of one implementation of a fuel tank including an endoskeleton carrying various fuel system components and a fuel tank body supported by the endoskeleton;

FIG. 2 is a cross-sectional view of the fuel tank of FIG. 1 taken along line 2-2 of FIG. 1;

FIG. 7 is an enlarged fragmentary perspective view of a portion of the endoskeleton shown in FIG. 6, taken from circle 7;

FIG. 8 is a bottom perspective view of the endoskeleton of FIG. 1 without the fuel system components;

FIG. 9 is an enlarged perspective view of a portion of the endoskeleton shown in FIG. 8, taken from circle 9;

DETAILED DESCRIPTION OF PREFERRED EMBODIMENTS

Figure 3:
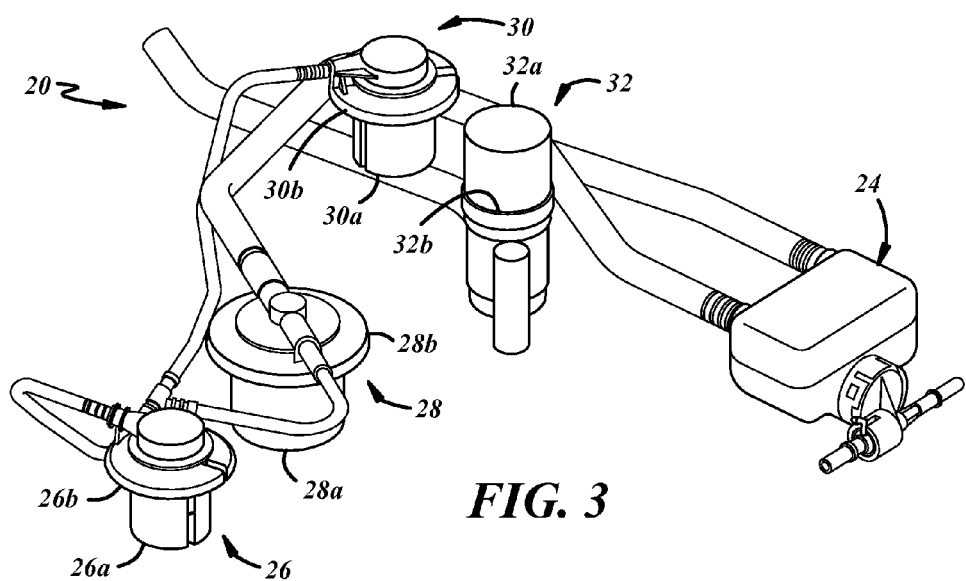
FIG. 3 is a perspective view of the fuel system components of FIG. 1.

Referring in more detail to the drawings, FIGS. 1 and 2 illustrate a tank 10, for example, a fuel tank for a vehicle. The tank 10 includes a shell or body 12 having an upper wall 14, a lower wall 16 (FIG. 2), and side walls 18 between the upper and lower walls 14, 16 and defining an interior I (FIG. 2) of the body 12 to store fuel. Of course, any size and shape of fuel tank with any arrangement of surfaces and/or walls may be used. The tank 10 also includes a support or endoskeleton assembly 20 that is disposed in the body 12 and that includes a support or endoskeleton 22 that may reinforce the tank body 12, baffle fuel in the tank body 12, and/or carry other components. In other words, the endoskeleton 22 may define a unitary tank body reinforcement, liquid fuel baffle, and/or component carrier for a plurality of fuel system components of the assembly 20.

For example, as shown in FIG. 3, the assembly 20 may also include one or more of the following components: a liquid vapor separator (LVS) 24, a first rollover valve (ROV) 26, a fuel level vent valve (FLVV) 28, a second ROV 30, and a fuel tank isolation valve (FTIV) 32, all carried by the endoskeleton 22 (FIG. 1). The first ROV 26 may include a combined ROV (C-ROV) that integrates pressure holding functionality into a rollover valve. The FTIV 32 may include a magnetic or solenoid or other pressure holding valve with pressure relief on demand functionality for refueling. The components may also include any suitable conduit, connectors, and the like for the aforementioned components.

Figure 4:
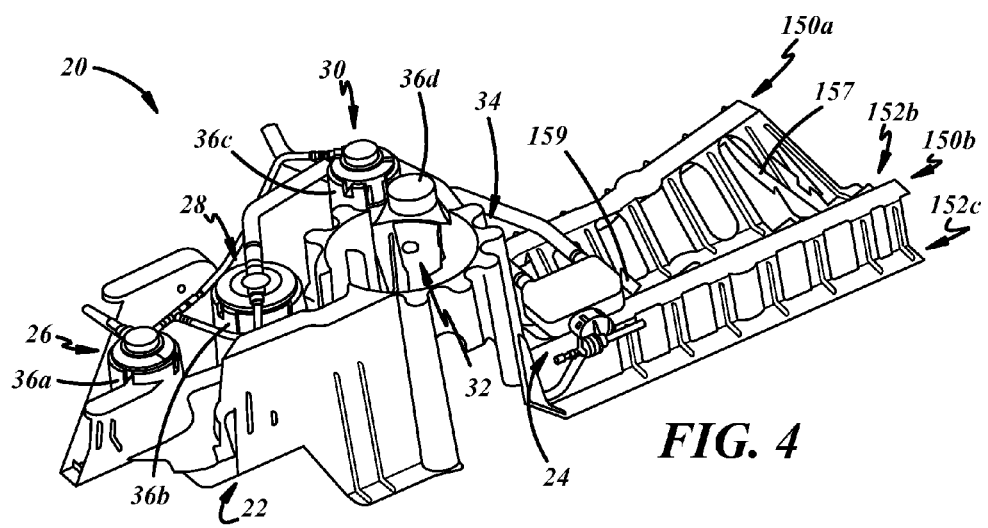
FIG. 4 is a right hand side perspective view of the endoskeleton and fuel system components of FIG. 1.
Figure 5:
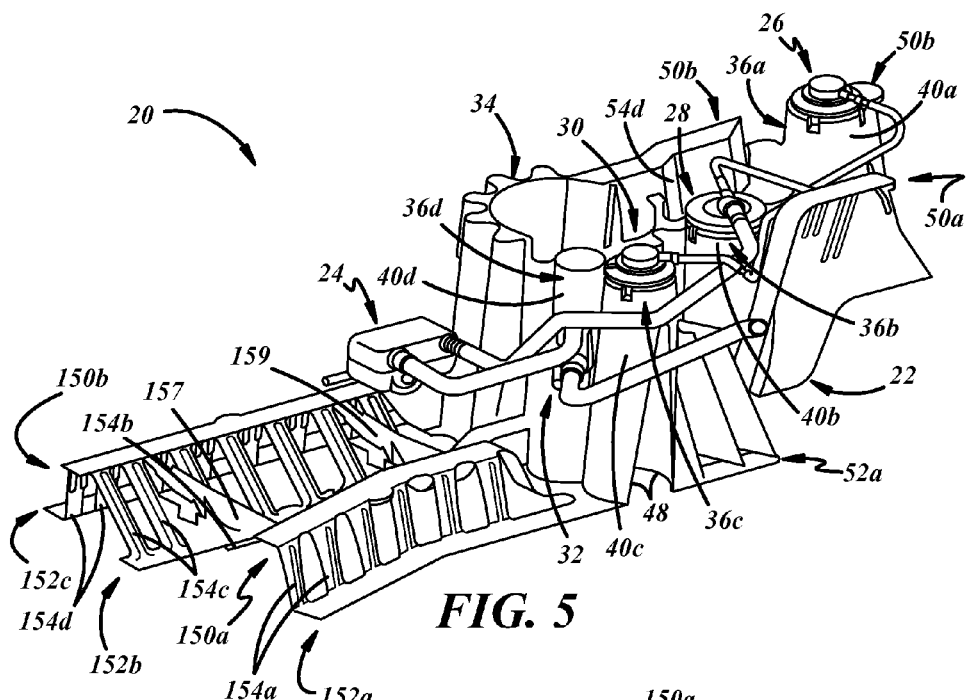
FIG. 5 is a left hand side perspective view of the endoskeleton and fuel system components of FIG. 1.

Referring to FIGS. 4 and 5, in one implementation, the endoskeleton 22 may be akin to a space frame or truss-like structure with interconnecting beams, walls, cross-members, and columns as will be discussed in greater detail below. The endoskeleton 22 may be a unitary support structure constructed to support the fuel tank body 12 from within instead of from the outside. The tank 10 may be considered an endoskeletal fuel tank.

For example, the endoskeleton 22 may include a first column 34 to support a fuel pump module (not shown), and a plurality of other columns 36a-36d to carry the aforementioned components 26, 28, 30, 32. The columns 36a-36d may be of varying heights and sizes, extending in a generally vertical direction (when in the orientation shown in the drawings). Also, the columns may be at least partially hollow and socket-like for easy snap-in or frictional fit of the components 26-32.

Referring to FIG. 3, the components 26-32 may include generally cylindrical portions 26a, 28a, 30a, 32a to fit in corresponding cylindrical seats or cavities of the columns 36a-36d (FIGS. 4-5). The components 26-32 may also include flange portions 26b, 28b, 30b, 32b extending from the cylindrical portions 26a-32a to locate the components 26-32 against corresponding axial end portions of the columns 36a-36d (FIGS. 4-5).

Figure 6:
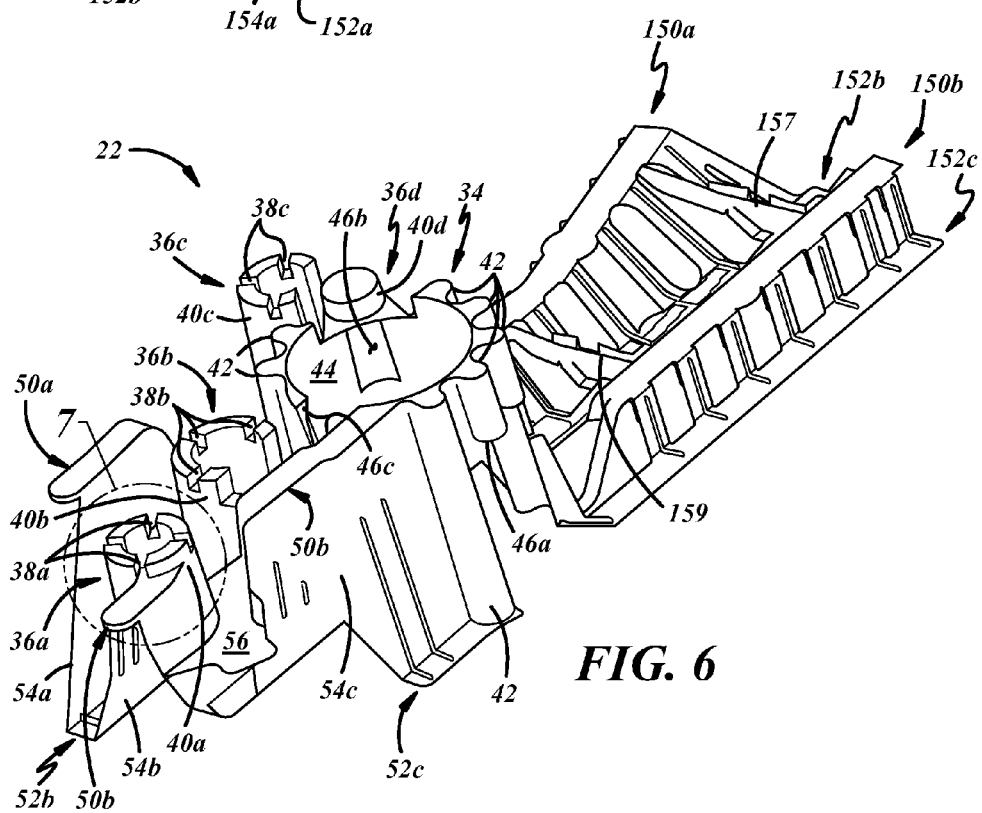
FIG. 6 is a right hand side perspective view of the endoskeleton of FIG. 1 without the fuel system components.

Referring to FIG. 6, the columns 36a-36c may include notches or grooves 38a, 38b, 38c defining castellations. The grooves 38a, 38b, 38c may provide good venting characteristics for the assembly 20. Also, referring to FIGS. 5 and 6, the columns 34, 36a-36d may include generally cylindrical walls 40a, 40b, 40c, 40d that may be tapered and contoured in any suitable manner. For example, the fuel pump module column 34 may be generally tapered from a wider bottom toward a narrower top and may be of corrugated or undulating wall geometry as shown in FIGS. 4, 5, 6, and 8. This wall geometry may provide good strength characteristics of the endoskeleton 22 and may define upper and lower connections with other portions of the endoskeleton 22 that are circumferentially offset or staggered for good molding characteristics. More specifically, the column 34 may include a corrugated external wall 42 and a corresponding corrugated internal wall 44, as best represented in FIG. 8. Accordingly, the column 34 may be a relatively light-weight and strong support for a fuel pump module (not shown).

Also, the columns 34, 36a-36d may include one or more apertures through the walls thereof. For example, as shown in FIG. 6, the module column 34 may include an arm aperture 46a to accommodate a fuel level indicator arm (not shown), an FTIV aperture 46b to accommodate a portion of the FTIV valve 32, and a trough aperture 46c to allow fuel into the column 34. Also, as shown in FIG. 5, the second C-ROV column 36c may include an aperture 48 in its wall 40c that may be tapered in a general direction from bottom toward top. The columns 34, 36a-36d may be integrally interconnected by various walls and beams as will be described more specifically below.

In general, the beams may be laterally-offset or spaced apart, generally parallel, and generally horizontally extending with respect to the columns 34, 36a-36d. Also, the beams may include tank contact portions that attachable to the walls of the tank body 12 to yieldably restrain movement of the tank body walls. More specifically, as shown in FIGS. 1, 5, 6, and 8, the endoskeleton 22 may include a plurality of beams which may include laterally spaced apart upper or first beams 50a, 50b and laterally spaced apart lower or second beams 52a, 52b, 52c extending rearwardly of the column 34. The first beams 50a, 50b may be laterally staggered with respect to the second beams 52a, 52b, 52c, as best shown in FIG. 1. The second beams 52a-52c may include three laterally spaced apart beams that may include two outboard beams 52a, 52c and one inboard beam 52b, and the first beams 50a, 50b may include two laterally spaced apart beams.

The various beams may be interconnected by generally vertically extending walls. More specifically, as best shown in FIG. 6, the beams 50a, 50b, 52a-52c may be interconnected by exemplary walls 54a, 54b, 54c, which may be ribbed for strength as shown. The walls 54a, 54b, 54c may be angled so as to connect the laterally spaced apart first and second beams 50a, 50b, 52a, 52b, 52c. The wall 54c and the first beam 50b may be interrupted to accommodate a fuel pump module trough, which may be defined by a trough floor 56, column walls 40a, 40b, and a wall 54d (FIG. 5) on an inboard side of the beam 50b. The trough may define a fuel flow path to the aperture 46c in the module column 34 and may include a first end proximate a rearward end of the endoskeleton 22 and a second end at the aperture 46 of the module column 34.

The contact portions of the beams may be provided with tank locking features for mechanical bonding of the endoskeleton 22 with the tank walls. The tank locking features may include projections to project into the tank wall material, or undercuts that become at least partially filled with tank wall material to promote good attachment of the endoskeleton 22 to the fuel tank walls. More specifically, and referring to FIG. 7, the first beam 50b may be provided with a plurality of nubs or projections 58. Similarly, as shown in FIG. 9, the second beam 52a also may be provided with a plurality of projections 60. Likewise, a bottom portion 62 of the valve column 36c, a bottom portion 64 of the module column 34, and another bottom portion 66 further may be provided with projections 60. The projections 60 may be injection molded pins integral with the rest of the endoskeleton 22 and may be about 1-2 mm in diameter and about 1-2 mm in length for penetration of about 1.5 mm into the tank walls. During molding of the tank 10, the projections 60 may become embedded in the walls of the still hot and soft walls of the tank body 12, and may partially melt and become fused to the tank walls.

In general, the endoskeleton 22 may include at a forward end a plurality of beams that may correspond to the aforementioned plurality of beams at the rearward end of the endoskeleton 22 and generally forward of the column 34. More specifically, referring to FIGS. 1, 4-6, and 8, the endoskeleton 22 may include a plurality of laterally spaced apart first beams 150a, 150b, and a plurality of spaced apart second beams 152a, 152b, 152c that may include two outboard beams 152a, 152c and one inboard beam 152b. Also, as best shown in FIGS. 1 and 2, the endoskeleton 22 may also include a plurality of walls 154a-154d extending transversely between the adjacent first and second beams 150a, 150b, 152a-152c. The walls 154a-154d may obtusely angled, wherein the walls 154a-154d extend at obtuse angles with respect to the upper and lower beams 150, 152 so as to connect the spaced apart beams 150, 152. The beams 150a, 150b, 152a-152c and the walls 154a-154d may be ribbed for reinforcement as shown. The LVS 24 may be carried by and coupled to any of the beams, for example, as shown in FIGS. 1, 4, and 5, the upper forward beam 150b may carry the LVS 24. The LVS 24 may be clipped, bonded, fused, tied, banded, snap-fit or pressed into or onto a pocket or seat, or coupled in any other suitable manner to the beam 150b.

The geometry and dimensions of the walls 154a-154d are such that the walls 154a-154d may double as both spring members and baffle members. When the first and second beams 150a, 150b, 152a-152c are displaced away from one another under expansion of the fuel tank body 12 due to, for example, pressure build up in the tank body 12, the walls 154a-154d flex to allow some such displacement but are resilient so as to urge the beams 150a, 150b, 152a-152c back to their rest position. For example, it is believed that the tank 10 may be able to withstand on the order of 100 mbar to 1 bar of internal pressure and yet control deflection of the tank walls to within about 10 mm. The endoskeleton 22 may also include spaced apart cross-members 157, 159 that may extend laterally or transversely between the first beams 150a, 150b and longitudinally between adjacent pairs of the walls 154 for lateral reinforcement. The cross-members 157, 159 instead or additionally could extend between the second beams 152a, 152b, 152c. Also, the walls 154a-154d may be segmented to define fuel flow passages 155a-155d between the walls 154a-154d. Although liquid fuel may wend and weave its way through the various passages 155a-155d in the walls 154a-154d, the walls 154a-154d tend to restrict en masse side-to-side sloshing of liquid fuel.

Figure 10:
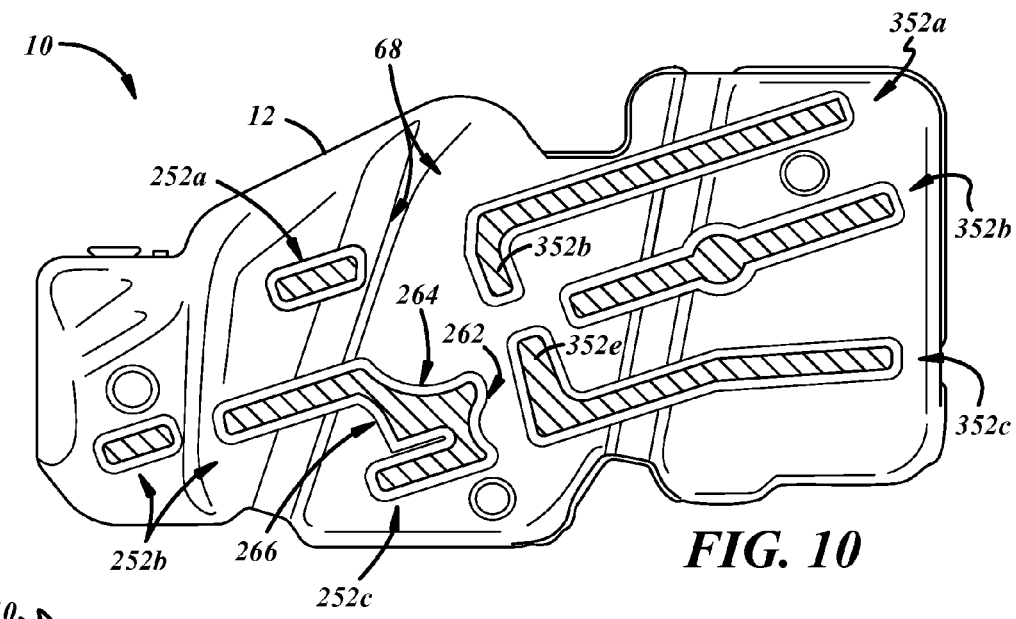
FIG. 10 is a bottom view of the fuel tank of FIG. 1, illustrating a bottom endoskeleton contact pattern.
Figure 11:
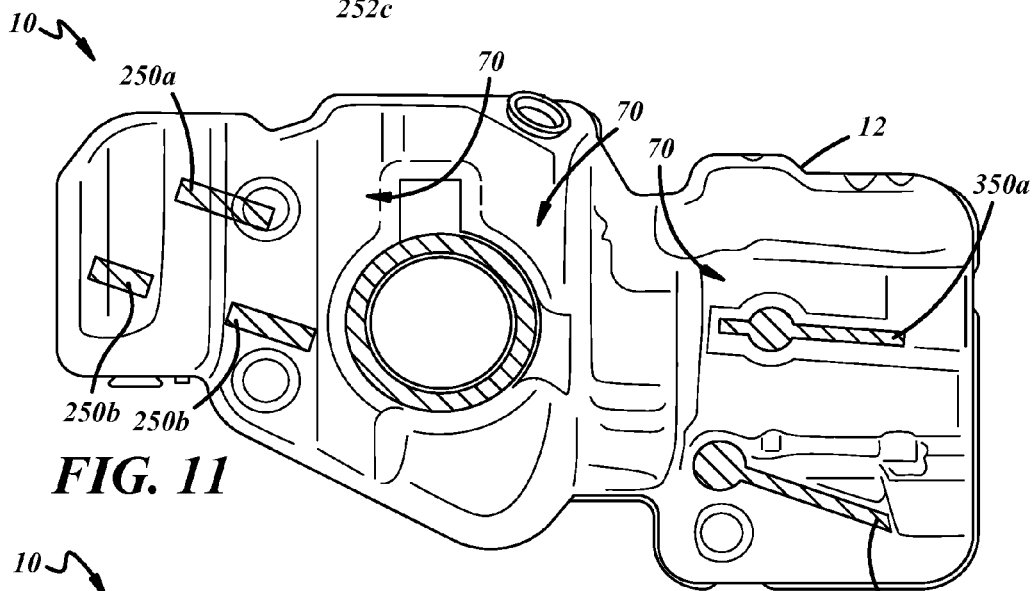
FIG. 11 is a top view of the fuel tank of FIG. 1, illustrating a top endoskeleton contact pattern.
Figure 12:
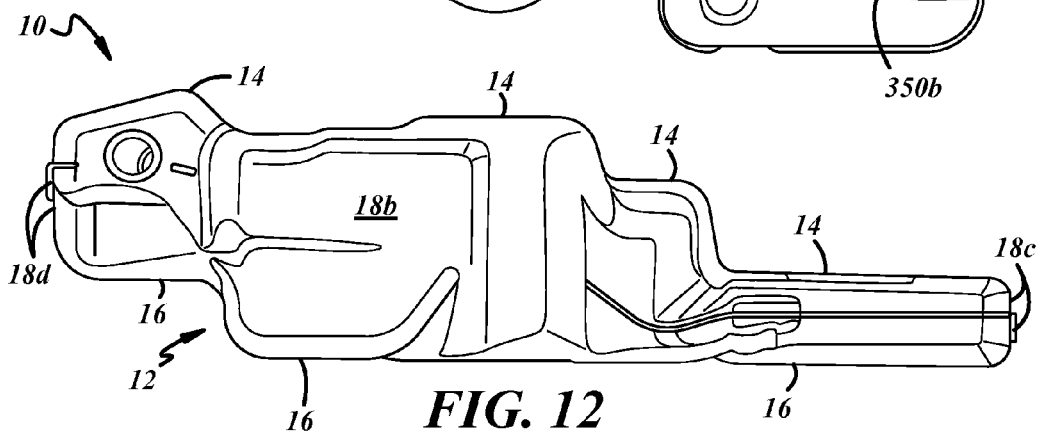
FIG. 12 is a left side view of the fuel tank of FIG. 1.
Figure 13:
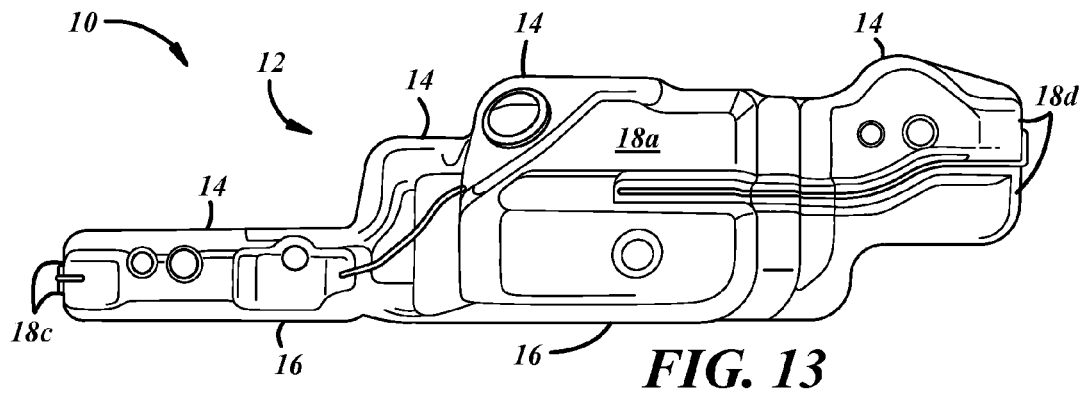
FIG. 13 is a right side view of the fuel tank of FIG. 1.
Figure 14:
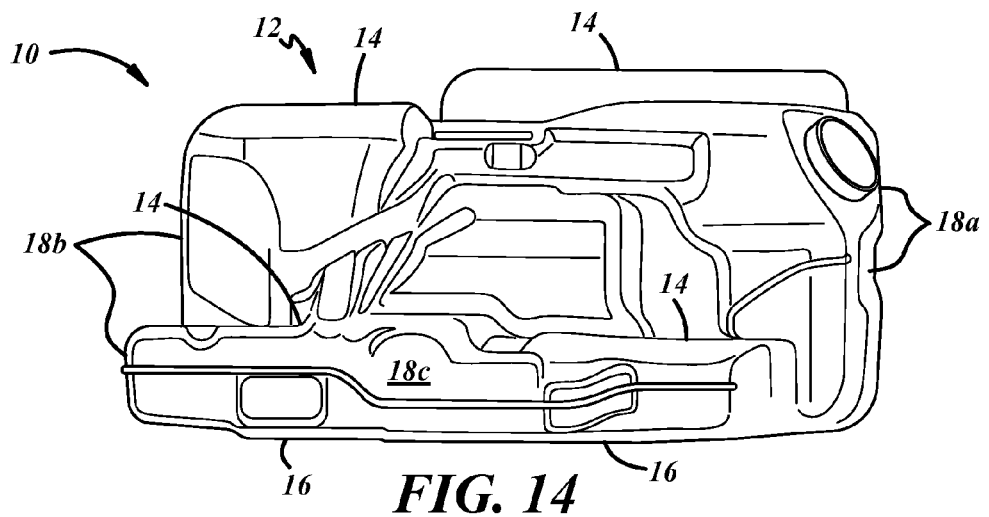
FIG. 14 is a front view of the fuel tank of FIG. 1.
Figure 15:
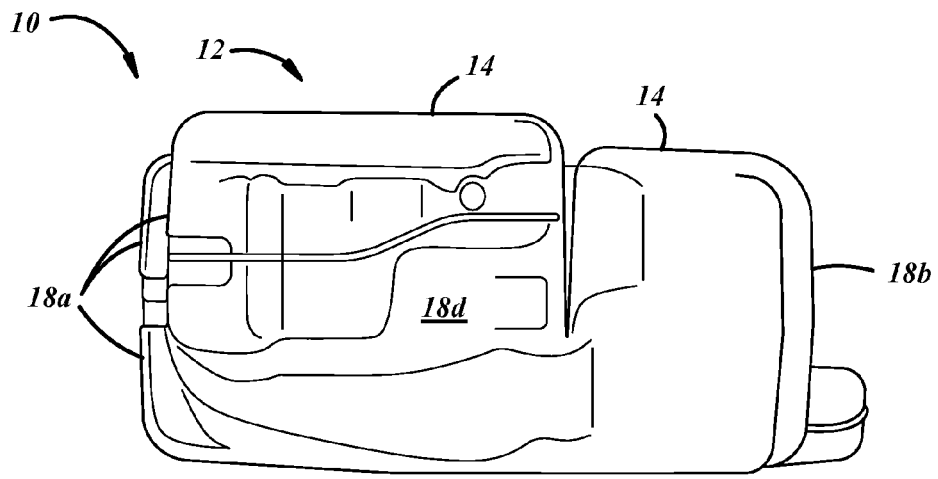
FIG. 15 is a rear view of the fuel tank of FIG. 1.

Referring now in general to FIGS. 10 and 11, the endoskeleton 22 cooperates with the fuel tank body 12 according to a footprint of contact portions of the endoskeleton 22 and corresponding portions of the fuel tank body 12. An exemplary range of ratios of endoskeleton-to-tank contact surface area may include greater than about 3% of the total interior surface area of the tank body 12. In a particular exemplary range, the contact surface area ratio may be about 3 to 12%. In a more particular exemplary range, the contact surface area ratio may be about 4 to 8%, for instance, about 6%. An exemplary range of contact surface area for a typical contact portion may be about 50 to 150 square millimeters.

As shown in FIG. 10, a second beam footprint 68 may include various contact portions that correspond to various portions of the endoskeleton 22. More specifically, contact portions 252a-252c of FIG. 10 correspond to second beams 52a-52c of FIG. 8, and contact portions 262-266 of FIG. 10 correspond to a valve column bottom portion 62, a module column bottom portion 64, and the other bottom portion 66 of FIG. 8. Also, contact portions 352a-352c of FIG. 10 correspond to second beams 152a-152c of FIG. 8, and transverse contact portions 352d, 352e of FIG. 10 correspond to transverse legs 152d, 152e extending from respective beams 52a, 52c.

Likewise, as shown in FIG. 11, an first beam footprint 70 may include various contact portions that correspond to various portions of the endoskeleton 22. More specifically, contact portions 250a, 250b of FIG. 11 correspond to first beams 50a, 50b of FIG. 6. Also, contact portions 350a, 350b correspond to first beams 150a, 150b of FIG. 6.

FIGS. 12 through 15 illustrate various orthogonal views of the exemplary tank 10. The tank body 12 may be molded around the endoskeleton 22 in any suitable manner. According to one example, the body 12 may be blow molded and/or vacuum drawn from an extruded parison (not shown), which may be split in two halves. More specifically, the tank 10 may be produced according to the apparatus and process described in co-pending patent application Ser. No. 12/491, 964 filed on Jun. 25, 2009, entitled "RECEPTACLE MANUFACTURING" and assigned to the assignee hereof and incorporated herein by reference in its entirety.

The tank 10 may be produced with a relatively thin walled tank body 12 and may be lighter, even with the added endoskeleton 22, than a comparable tank that does not include the endoskeleton 22. For example, it is believed that the endoskeleton 22 reinforces the tank body 12 to such a degree that the tank body 12 can be produced with a mere 2 mm to 4 mm wall thickness. Such thin walls are in contrast to typical fuel tank wall thicknesses of 4 mm to 6 mm. As used herein, the terminology "thickness" may include average tank wall thickness over an entire tank body, plus or minus usual manufacturing tolerances.

Despite the added weight of the endoskeleton 22, the overall weight of the tank body 12 and endoskeleton 22 may be less than a corresponding conventional tank of corresponding volume. More specifically, the weight savings in reduced wall thickness to about 2 to 4 mm may result in a combined weight of the body 12 and endoskeleton 22 that is less than the weight of the tank body 12 without the endoskeleton 22 if the tank body 12 was about 4 to 6 mm in thickness and composed of the same material. According to one exemplary estimate, a tank with a wall thickness of about 5 mm and weighing 7.5 kg is replaceable with a tank having a body with wall thickness of about 3 mm and weighing 4.5 kg and reinforced with a 1 kg endoskeleton for a combined weight of only 5.5 kg. This extraordinary result is in stark contrast to conventional wisdom, which has dictated use of relatively thick tank walls having portions with increased—not decreased—wall thicknesses and use of thick integral posts or kiss-offs that tend to increase—not decrease—the weight of the fuel tank.

Also, the tank body 12 and endoskeleton 22 may provide improved strength to weight performance. Such performance may be quantified by (volume×pressure)/weight, where volume is tank volume, pressure is that pressure which the tank can resist without unacceptable deformation or rupture, and weight is tank weight. For example, a typical automotive fuel tank that is about 50 liters in volume, is about 20 kilograms in weight and provides about 100 millibar in pressure resistance. Thus, the typical tank strength to weight ratio is about (50 l×100 mbar)/20 kg, or about 250 l-mbar/kg. In contrast, according to the present disclosure, the tank body 12 and endoskeleton 22 may weigh only about 12.5 kg for the same 50 liter volume and 100 millibar pressure resistance, for a strength to weight ratio of about 400 l-mbar/kg. Accordingly, a tank assembly according to the present disclosure provides a strength to weight ratio that is greater than 250 l-mbar/kg and, more particularly, at least about 300 to 400 l-mbar/kg.

In general, the tank 10 may be manufactured according to techniques known to those skilled in the art, including injection molding, blow molding, vacuum drawing, and the like. Also, the tank 10 may be assembled according to known techniques, automatic or manual. Likewise, any suitable materials can be used in making the components, such as metals, composites, polymeric materials, and the like. Such materials can be selected based on their dimensional stability and resistance to swelling and degradation in warm and cold petroleum product environments. For example, the endoskeleton 22 may be injection molded and composed of virgin, regrind, or blended high density polyethylene (HDPE), and the tank body 12 may be blow molded and composed of HDPE, ethylene vinyl alcohol (EVOH), and adhesive layers.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. By way of example without limitation, while the fuel tank body 12 and endoskeleton 22 have been shown as being of particular geometry, any desired tank geometry may be used. The invention is defined by the following claims.

What is claimed is:

1. A unitary support for a tank body of a fuel tank, comprising:
    a plurality of at least partially hollow columns integrally interconnected by walls and the columns include a fuel pump module column and at least one of a C-ROV column, an FLVV column, or an FTIV column;
    a plurality of spaced apart generally horizontally extending upper and lower beams integrally interconnected to the plurality of hollow columns and being staggered with respect to one another such that the upper beams are not directly above the lower beams, and having tank contact portions; and
    a plurality of obtusely angled walls extending between and interconnecting adjacent upper and lower beams, wherein the lower beams include three laterally spaced apart beams including two outboard beams and one inboard beam, and the upper beams include two laterally spaced apart beams.

2. The support of claim 1 wherein the fuel pump module column is corrugated.

3. The support of claim 2 wherein the fuel pump module column is also tapered.

4. The support of claim 1 wherein the columns are tapered.

5. The support of claim 1 further comprising crossmembers extending transversely between the beams.

6. The support of claim 1 wherein the support includes fuel flow passages between the walls.

7. An assembly including the support of claim 1 and a plurality of fuel system components that are snapped-in or frictionally fit to corresponding cavities of the columns.

8. A unitary support for a tank body of a fuel tank, comprising:
    a plurality of at least partially hollow columns to support a plurality of fuel system components;
    a plurality of spaced apart generally horizontally extending upper and lower beams being staggered with respect to one another such that the upper beams are not directly above the lower beams, and having tank contact portions; and
    a plurality of walls extending between and connecting adjacent upper and lower beams,
    wherein the plurality of at least partially hollow columns includes a fuel pump module column to support a fuel pump module and that includes at least one of a fuel level indicator arm opening or a trough opening to receive fuel, and wherein the lower beams include three laterally spaced apart beams including two outboard beams and one inboard beam, and the upper beams include two laterally spaced apart beams.

9. The support of claim 8 further comprising a trough including trough bottom wall and side walls in communication with the trough opening of the fuel pump module column.

* * * * *